United States Patent
Yvetot et al.

(10) Patent No.: US 11,164,468 B2
(45) Date of Patent: Nov. 2, 2021

(54) STANDARDIZING PLATFORM APPROACHES FOR AIRCRAFT

(71) Applicant: THALES, Courbevoie (FR)

(72) Inventors: Ahlam Yvetot, Toulouse (FR); Alain Dayot, Toulouse (FR)

(73) Assignee: THALES, Courbevoie (FR)

( * ) Notice: Subject to any disclaimer, the term of this patent is extended or adjusted under 35 U.S.C. 154(b) by 640 days.

(21) Appl. No.: 15/806,108

(22) Filed: Nov. 7, 2017

(65) Prior Publication Data

US 2018/0130363 A1 May 10, 2018

(30) Foreign Application Priority Data

Nov. 10, 2016 (FR) ...................................... 1601600

(51) Int. Cl.
*G08G 5/02* (2006.01)
*G01C 23/00* (2006.01)
*G08G 5/00* (2006.01)
*G05D 1/06* (2006.01)
*B64D 43/00* (2006.01)

(52) U.S. Cl.
CPC ............ *G08G 5/025* (2013.01); *G01C 23/00* (2013.01); *G05D 1/0676* (2013.01); *G08G 5/0017* (2013.01); *G08G 5/0034* (2013.01); *B64D 43/00* (2013.01); *Y02T 50/80* (2013.01)

(58) Field of Classification Search
CPC .... G08G 5/025; G08G 5/0034; G08G 5/0017; Y02T 50/84; B64D 43/00; G05D 1/0676; G01C 23/00
See application file for complete search history.

(56) References Cited

U.S. PATENT DOCUMENTS

| | | | | |
|---|---|---|---|---|
| 6,718,236 | B1 * | 4/2004 | Hammer ............. | G08G 5/0008 342/36 |
| 8,442,706 | B2 | 5/2013 | Doeppner et al. | |
| 9,189,963 | B2 | 11/2015 | Iraudo et al. | |
| 2012/0218127 | A1 * | 8/2012 | Kroen ................. | G08G 5/0034 340/945 |
| 2014/0244079 | A1 * | 8/2014 | Iraudo ...................... | G08G 5/02 701/16 |
| 2016/0307450 | A1 * | 10/2016 | Songa ................. | G08G 5/0013 |
| 2018/0018885 | A1 * | 1/2018 | Khatwa ................ | G05D 1/0061 |

FOREIGN PATENT DOCUMENTS

| EP | 2 811 357 A1 | 12/2014 |
|---|---|---|
| EP | 2 996 008 A1 | 3/2016 |

* cited by examiner

*Primary Examiner* — Mathew Franklin Gordon
(74) *Attorney, Agent, or Firm* — BakerHostetler

(57) ABSTRACT

A method to manage approaches to a platform (in particular at sea and operated by a helicopter) comprises the steps of receiving initial parameters and determining four particular waypoints (called IAF, IF, FAF and MAP). These flight plan points respectively determine the starting point of the approach procedure, the intermediate point corresponding to the end of the initial alignment and to the start of the capture of the final approach axis, the starting point of the final approach, and the point of decision to terminate the approach or initialize a go-around. Different developments describe different types of approaches that can be achieved by this method, the management of the descent and speed profiles, the management of the safety distances and the management of the display of the piloting instructions. Software and system aspects are described.

14 Claims, 4 Drawing Sheets

STANDARDIZING PLATFORM APPROACHES FOR AIRCRAFT

CROSS-REFERENCE TO RELATED APPLICATIONS

This application claims priority to foreign France patent application No. FR 1601600, filed on Nov. 10, 2016, the disclosure of which is incorporated by reference in its entirety.

FIELD OF THE INVENTION

The invention relates to the technical field of the flight management systems (FMS) of aircraft, in particular of helicopters.

BACKGROUND

The so-called offshore platforms denote installations at sea operating oil-producing fields. These platforms require particular approaches for aircraft (e.g. helicopters or drones) to be able to land thereon.

The technical problems to be resolved consist in particular in being able to define approach trajectories—in four dimensions—to such offshore platforms, then in being able to effectively guide aircraft over these defined trajectories. The guidance has to be performed in safety, by observing the regulations currently in force, by giving the pilot alignment fixes, and by unifying the geometry and the conduct of the different types of approaches.

The regulation (for example FAA AC90-80) describes different types of approaches (e.g. Parallel OFFSET OSIO/OSIO AUTO, DELTA 30 OSIO, DELTA 10/30 OSIO). These approaches bring the aircraft to a point of decision (MAP) to terminate in manual piloting mode and land it on the platform when the visibility is adequate or to initiate a go-around. According to the OACI regulation, the approaches are defined by four waypoints, the name and the definition of which are standardized: 1) IAF for Initial Approach Fix (starting point of the approach procedure); 2) IF for Intermediate approach Fix (point from which the aircraft begins the capture of the final approach point); 3) FAF for Final Approach Fix (starting point of the final approach to the runway or the helideck) and 4) MAP for Missed Approach Point (point of decision from which the crew chooses to terminate its approach or initiate a go-around which interrupts the current approach procedure).

The construction of the flight plan of an aircraft approaching a platform (meeting up with a helideck or a landing zone) comprises the definition of the four regulatory waypoints (IAF, IF, FAF and MAP) and that of a set of parameters, in particular the coordinates of the landing zone, a minimum safety height relative to the sea, a lateral axis of arrival or a sector of arrival to the platform, a safety distance, a lateral offset value relative to the approach axis called 'offset' (to the left or right of the axis) to manage the approaches of "Offset" type and an angular deviation value "Delta" to manage the approaches of "Delta" type.

The publications of the prior art include limitations. For example, the starts of the approaches according to this prior art do not systematically start in the approach axis. The approach profiles for these different types of approach (according to the vertical axis and the lateral axis) can notably diverge. For example, the IAF can be sometimes in the axis, but sometimes not, the vertical profile can be different at the same points. This lack of uniformity results in development and training cost overheads and can pose human factor-related problems. Furthermore, the regulation describes only a limited number of approaches.

The patent literature includes a few documents, whose teachings are inadequate. For example, the document U.S. Pat. No. 8,442,706 remains silent regarding the IF waypoint and the IAF and FAF points are offset by an offset value. This approach is therefore different from the DELTA approach and does not resolve the problems of unification of the different types of approaches mentioned above. The document U.S. Pat. No. 9,189,963 describes approaches of DELTA type but does not describe the offsets. Moreover, the starts of the approaches proposed differ from the approaches of offset type.

There is therefore a need for methods unifying the management of the platform approaches, for example offshore platforms at sea, altiports or in an urban environment with the presence of obstacles.

SUMMARY OF THE INVENTION

A method is described that is implemented by computer to manage different types of approaches to a platform (in particular at sea and for example operated by a helicopter). These methods are advantageously configurable and can in particular allow a guidance in 4 dimensions (three spatial dimensions plus the time dimension) starting in particular with an alignment in the axis of arrival on the platform.

This method can comprise steps consisting in defining the configuration, selecting the initial parameters and in determining the four particular waypoints (called IAF, IF, FAF and MAP). These flight plan points respectively determine the start of the approach procedure aligned on the approach axis of the platform, the intermediate approach point to begin the capture of the final approach point, the final approach point for starting the final descent, and the point of decision as to the act of setting down or of landing the aircraft or of interrupting the approach.

Different developments hereinbelow describe situations involving different types of approaches, the management of the descent and speed profiles, the management of the safety distances and the management of the display of the piloting instructions. Software and system aspects are described.

Advantageously, the method according to the invention makes it possible to ensure and unify the management of different (even all) platform approaches (in particular for offshore platforms at sea) and allows for advantageous developments relative to the existing regulation (e.g. AC90-80).

BRIEF DESCRIPTION OF THE DRAWINGS

Other features and advantages of the invention will become apparent from the following description and from the figures of the attached drawings in which.

DETAILED DESCRIPTION

Figure 1:
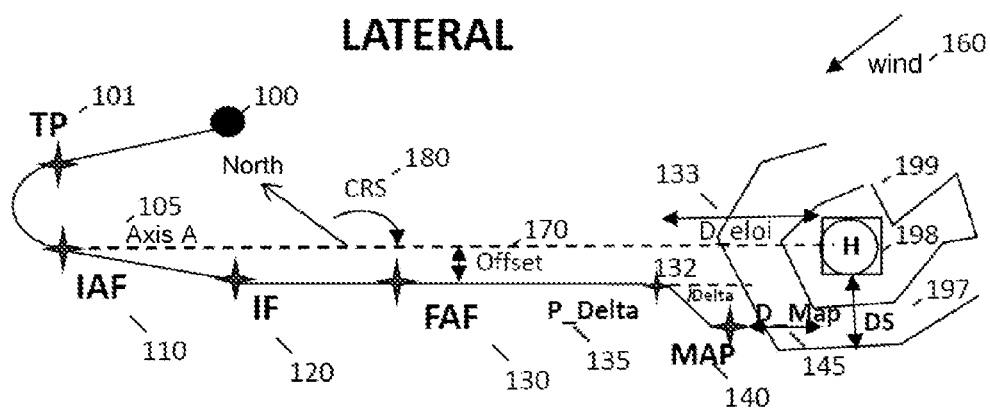
FIG. 1 illustrates an example of lateral trajectory determined by an embodiment of the invention (approach of OFFSET/DELTA mixed type)

An aircraft according to the invention can be controlled by a human being and/or a machine (e.g. automatic control, remote control). An aircraft can be a helicopter. An aircraft can also be a remote-controlled drone.

A platform according to the invention can be an installation at sea intended to extract natural resources (gas, oil), or an altiport or even a landing zone situated in an urban environment (comprising obstacles). A platform is generally fixed but in some embodiments, the platform can be mobile (e.g. mobile oil-producing platform, aircraft carrier, oceanographic or leisure boat).

A method is described for managing the approach to a platform by an aircraft, implemented in a flight management system, the method comprising the steps consisting in: —receiving initial parameters and—from these initial parameters determining an approach trajectory comprising at least the coordinates of four waypoints including: —an IAF waypoint corresponding to the starting point of the approach procedure; —an intermediate waypoint IF corresponding to the end of the initial alignment and to the start of the capture of the final approach point; —a FAF waypoint corresponding to the starting point of the final approach to the landing zone; and a MAP waypoint corresponding to the point of decision to terminate the approach or initialize a go-around.

In a development, the initial parameters are determined by the steps consisting in:

receiving geographic coordinates of a landing zone called H on said platform;

receiving flight parameters relating to an axis of arrival (course) or an angular segment of arrival called CRS leading to said landing zone;

receiving an offset value called OFFSET;

receiving an angular deviation value called DELTA;

receiving a distance value from the MAP called D_map;

receiving a distance value for levelling off before the MAP;

receiving a distance value for levelling off before the FAF;

receiving a minimum safety altitude value called MSA;

receiving an altitude value for the start of the final approach called MDA;

receiving a procedure starting altitude value called MEA.

In a development, the four waypoints IAF, IF, FAF and MAP are characterized by—the IAF and IF waypoints of altitude MEA situated on the axis A starting from the landing point H and oriented by the course CRS;—the FAF waypoint of altitude MSA (preceded by an altitude stabilization level) aligned in the lateral plane on the axis A with the IAF and IF points if the OFFSET value is equal to zero, and offset from this OFFSET value relative to the axis A otherwise; and—the MAP waypoint of altitude MDA (preceded by an altitude stabilization level) aligned according to the orientation of axis A with the FAF waypoint if the angular deviation value DELTA is nil, and offset angularly from the axis A otherwise, said MAP waypoint being situated at a distance equal to D_map relative to the landing zone H.

In a development, the method further comprises a step consisting in graphically displaying one or more of the coordinates of the IAF, IF, FAF and MAP waypoints.

In a development, the method further comprises a step consisting in graphically displaying one or more aircraft guidance instructions to follow the 4D trajectory comprising the IAF, IF, FAF and MAP waypoints.

In a development, the method further comprises a step consisting in receiving at least one indication on the conditions of capture of the approach circuit so as to be able to compute a turn start point called TP to capture the IAF by being aligned on the approach axis.

In a development, the method further comprises a step consisting in receiving speed instructions at the different waypoints of the approach procedure in order to be able to manage the speed profile to be observed; these speed instructions can be air speeds or ground speeds.

In a development, the method further comprises a step consisting in receiving indication of a safety distance DS associated with the geometry of the platform.

In a development, the MAP waypoint is then situated at a distance equal to the distance D_map protected from the safety distance DS relative to the landing zone H.

In a development, all the parameters which make it possible to automatically construct the 4D approach profile are configurable through a configuration table that can be adapted for each integrator or each operator, and for some of them adaptable also by the pilot (overload of default values from the configuration table).

In a development, all the parameters which give the characteristics associated with a platform in particular are derived from an airline or operator database (not modifiable on board the aircraft) or a user database (modifiable on board the aircraft) loaded into the computer.

In an embodiment, the value of the safety distance DS can be constant (e.g. radius of a circle or fixed at 1.1 NM). In one embodiment, the value of this safety distance DS can be variable (as a function of the polygonal geometry of the zone of obstacles around the landing platform), even configurable (determined by criteria that are fixed a priori or else computed dynamically as a function of the local environment parameters, e.g. sea condition, local turbulence, presence of pipelines or of hazardous products in proximity, etc.).

The distance DS can be symmetrical (in as much as a safety margin is added over the entire perimeter of the polygon of the landing zone). In one embodiment, the safety distance DS can be a fixed value taking account of a safety distance margin around the polygon, i.e. in order to create a homothetically enlarged polygon. In one embodiment, the safety distance DS can be a non-constant function, for example a "piecewise" constant function, e.g. whose value depends for example on the direction and the strength of the wind relative to the platform (the distance will be smaller into the wind and greater downwind).

In a development, the values of the offset OFFSET and of the angular deviation DELTA are equal to zero which makes it possible to create a conventional approach profile in the axis of arrival, by benefitting from all the parameterizing capacity of this profile.

In the general case, the pilot selects the non-nil OFFSET and DELTA parameters, which determines types of approach. In a particular case, the pilot can choose an approach of "DELTA" or "OFFSET" type which sets one or other of these values to zero. In a particular case, the pilot can choose a non-null value for the DELTA and OFFSET parameters corresponding to an approach of DELTA/OFFSET mixed type.

A computer program product is described, said computer program comprising code instructions making it possible to perform one or more of the steps of the method when said program is run on a computer.

A system is described for implementing one or more of the steps of the method. This system can in particular comprise a flight management system F.M.S. of avionics type. In one embodiment, the platform can be a platform of "offshore" type (at sea) and the aircraft can be a helicopter. In one embodiment, the platform can be mobile.

FIG. 1 illustrates an example of lateral trajectory (lateral profile) of an aircraft on approach to a platform, according to an OFFSET/DELTA mixed approach.

The aircraft 100 is on approach to the target platform 199, which comprises a landing zone 198.

The course of arrival CRS 180 designates the lateral axis of arrival Axis A 105 to the platform, oriented for example relative to the north.

The landing zone 198 can be associated with a safety distance DS 197 (function of the platform concerned). Upstream of the arrival, the aircraft 100 has to pass through the turning point called TP 101. The turning point TP is positioned on a circular arc ending on the IAF waypoint (defined hereinbelow), and oriented on the outside, of radius equal to the nominal turn capacity of the aircraft (e.g. helicopter, drone) for its approach manoeuvre.

The IAF waypoint 110 (IAF for Initial Approach Fix) corresponds to the starting point of the approach procedure, the IF waypoint 120 (IF for Initial Fix) corresponds to the point from which the aircraft begins the capture of the final approach axis to the FAF offset by the offset value 170 relative to the initial approach axis (so-called "Offset" type approaches). The FAF waypoint 130 (FAF for Final Approach Fix), corresponds to the starting point of the final approach. The MAP waypoint 140 (MAP for Missed Approach Point) corresponds to the point of decision from which the crew chooses to terminate its approach or to initiate a go-around; it is positioned according to the values of the OFFSET and DELTA parameters, and is located at a distance D_MAP 145 from the landing zone 198.

The point P_Delta 135 corresponds to the point from which the aircraft begins an angular deviation of value Delta 132 (as in the approaches of "Delta" type). It is located at a distance D_Eloi 133 from the landing zone 198.

The wind blowing around the platform is represented in the form of a wind vector 160.

Figure 2:
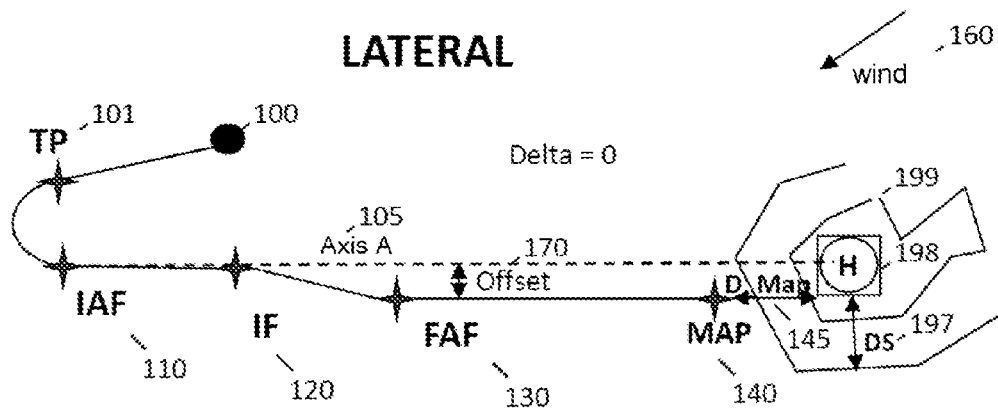
FIG. 2 illustrates an example of lateral trajectory determined by an embodiment of the invention (approach of OFFSET type)

FIG. 2 illustrates an example of lateral trajectory determined by an embodiment of the invention (OFFSET approach), a particular case of the mixed approach of FIG. 1 for which the DELTA 132 value is nil.

In this example, the IAF waypoint 110 and IF waypoint 120 are aligned on the axis A. The FAF waypoint 130 and MAP waypoint 140 are aligned on an axis offset by the OFFSET 170.

Figure 3:
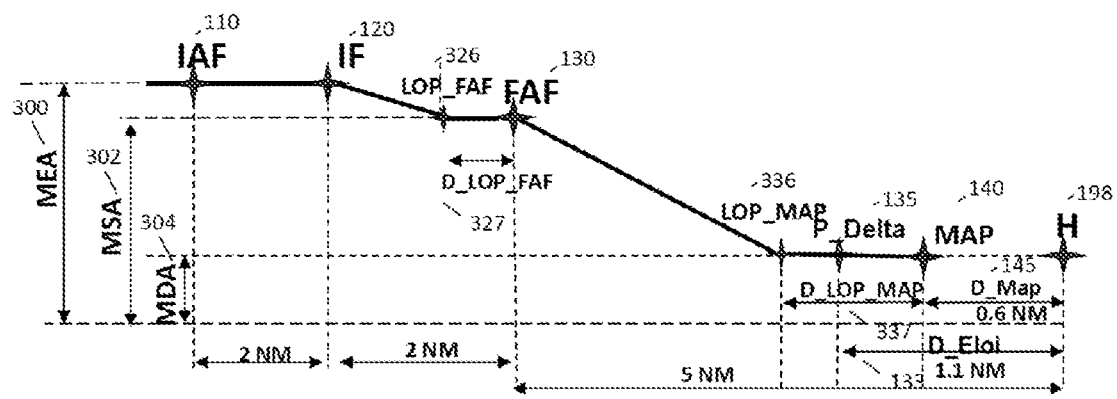
FIG. 3 illustrates an example of vertical trajectory determined by an embodiment of the invention applicable to all the types of approaches.

FIG. 3 illustrates an example of vertical trajectory of an aircraft on approach to a platform applicable to all types of approaches (DELTA, OFFSET, MIXED). The figure shows several distances or minimum altitudes, in particular:

a final cruise altitude MEA 300, associated with the IAF waypoint 120;
a minimum safety altitude MSA 302, associated with the FAF waypoint 140;
a minimum decision altitude MDA 304 relative to the sea (MDA for Minimum Descent Altitude, also called MDH for Minimum Descent Height).

In a variant embodiment, altitudes MSA and MEA can be merged.

The indication "Level off before FAF" embodied by the vertical point LOP_FAF 326 ("Level off before FAF") corresponds to a levelling off at a short distance D_LOP_FAF 327 before the FAF waypoint 130 (stabilization of the aircraft in speed and in altitude before the final approach).

The indication "Level off before MAP" embodied by the point DLOP_MAP 336 ("Level off before MAP") corresponds to a levelling off at a short distance D_LOP_MAP 337 before the MAP waypoint 140 (visual acquisition segment for deciding or not to continue the approach).

The numeric distance values (NM, for "Nautical Mile") and altitude values are given as an indication and can be configurable.

Figure 4:
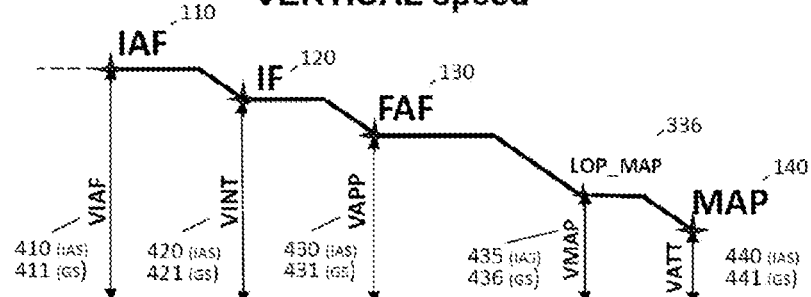
FIG. 4 illustrates an example of speed profile determined by an embodiment of the invention applicable to all the types of approaches.
Figure 5:
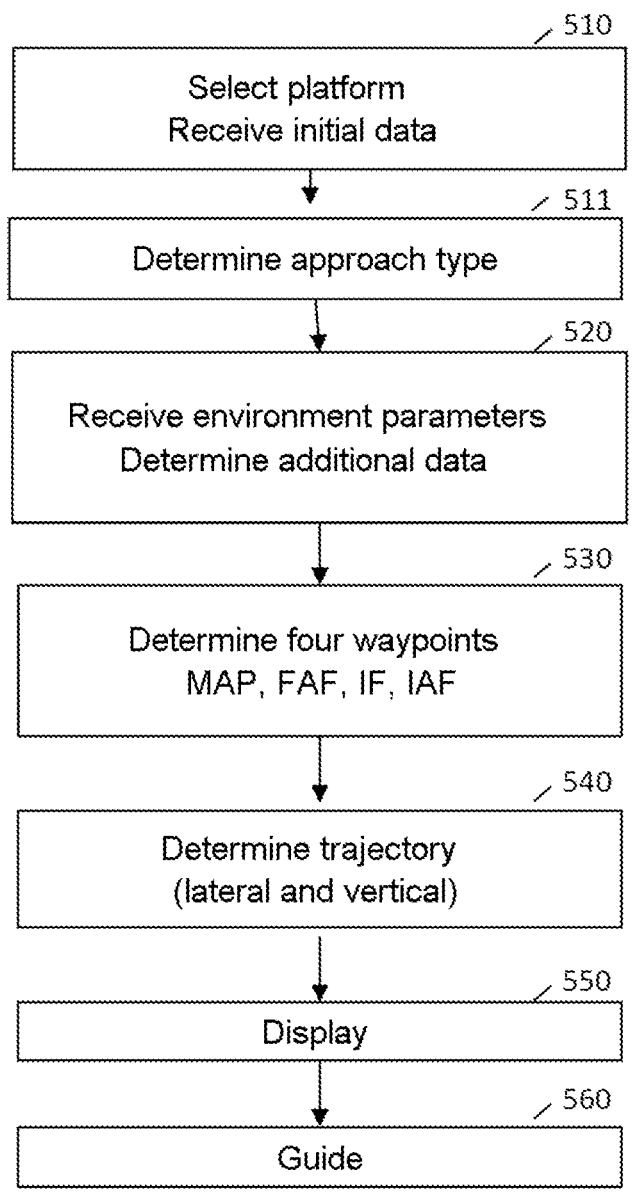
FIG. 5 illustrates examples of steps of the method according to the invention.

FIG. 4 illustrates an example of speed profile of an aircraft on approach to a platform applicable to all the types of approaches (DELTA, OFFSET, MIXED).

The figure shows the speed constraints (air speed called "IAS" or ground speed called "GS") to be observed on each of the waypoints: VIAF at the IAF (IAS 410, GS 411), VINT at the IF (IAS 420, GS 421), VAPP at the FAF (IAS 430, GS 31), VMAP at the level before MAP (IAS 435, GS 436), VATT at the MAP (IAS 440, GS 441).

In a variant embodiment not represented (variant embodiment of the OFFSET type approach described previously with early alignment), the value of DELTA is nil D_Eloi. The IF, FAF and MAP waypoints are aligned on an axis offset from the axis IAF-H by the value of the OFFSET. The IAF and IF waypoints are at the same altitude MEA and the FAF waypoint is at the altitude MSA. The MAP waypoint is at the altitude MDA.

In a variant embodiment not represented (of "Approach in the axis" type), the value of the offset OFFSET is nil, DELTA is nil and the distance D_map is nil. The IAF, IF, FAF and MAP waypoints are aligned laterally on the axis IAF-H. The AIF and IF waypoints are at the same altitude MEA and the FAF waypoint is at the altitude MSA. The MAP waypoint is at the altitude MDA.

Figure 6:
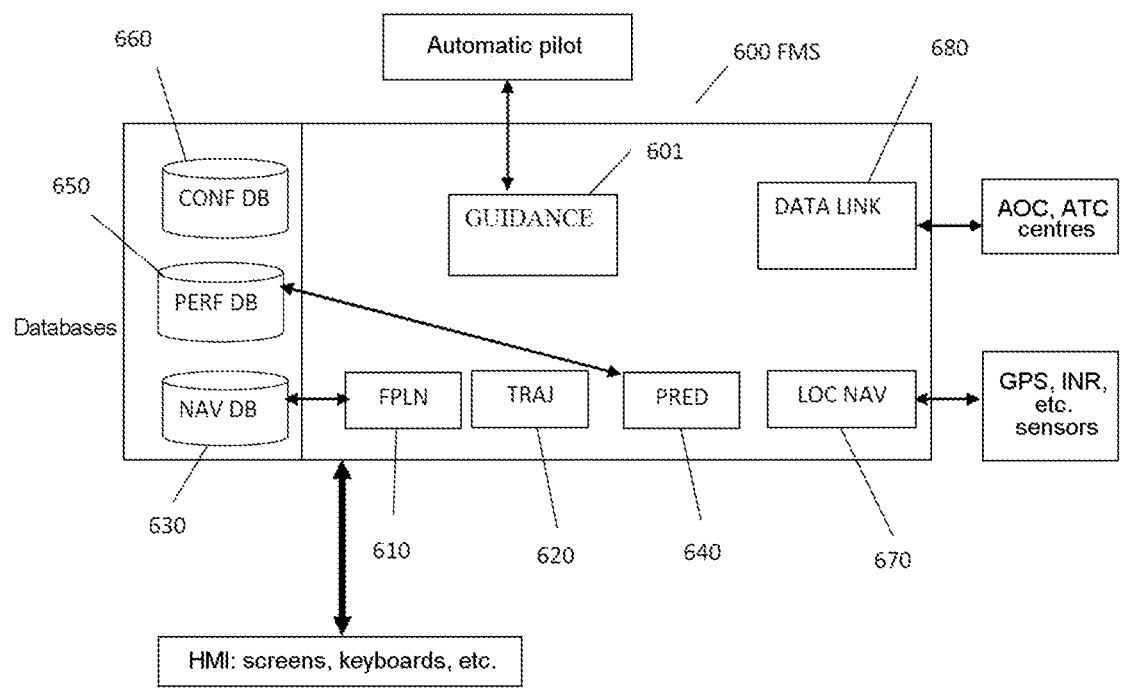
FIG. 6 schematically illustrates the structure and the functions of a flight management system of F.M.S. type for the implementation of an embodiment of the method according to the invention.

FIG. 6 illustrates examples of steps of the method according to the invention.

The method can comprise one or more of the following steps:

In the step 510, a platform (for example offshore) is selected (for example by the pilot and/or by a machine entity, according to predefined rules in the case of a drone). A database specific to the selected platform is then accessed and information is communicated on request. This database can, in certain cases, be similar to a navigation database according to the AEEC ARINC 424 standard. Such a database comprises, for example, the coordinates of the platform (e.g. latitude, longitude, the altitude of the helideck or of the landing zone). Optionally, the database can comprise or define or determine or communicate a "platform polygon" representing the shape of the platform (obstacle zone), a safety distance value called "DS" D_Eloi, a course (180) or default arrival sector, a default Delta angle (132) (and a left/right direction) a default Offset value (170) (and a left/right direction), an end-of-cruising altitude MEA (300) and a minimum safety altitude MSA (302) as well as other parameters that can be useful to the pilot (name of the platform, identification, communication frequencies, etc.).

Such information can also be received by an external communication. There are various possible communication modalities (authentication, right of access, encryption, etc.). In particular, a digital data link can be used. An air navigation control centre can be involved, like the airline, etc.

In the step 511, a type of approach and the characteristics for conducting the approach are determined.

Helideck H coordinates (198), course or sector of arrival, Offset, and Delta parameters are received.

Examples of intermediate steps are described hereinbelow.

In a step 5111, the axis of arrival "Axis A" (105) on the platform is determined. This is generally the semi-infinite half line starting from the helideck H, and oriented relative to the north by the value of "course of arrival". In one embodiment, the half line is oriented automatically within a sector of arrival (characteristic of the platform) so as to be as much as possible opposing the wind. In a variant embodiment, the half line is oriented by a manual input of the crew or after reception of a command received by digital data link. In a variant embodiment, the half line is oriented on the default value in the database.

In a step 5112, the direction of the offset is determined. In one embodiment, the determination of the offset (value and direction) is done automatically as a function of the information describing the obstacle zone around the landing zone and/or of the safety distance. In a variant embodiment, the direction of the offset is entered by a manual input of the crew or after reception of a command received by digital data link. In a variant embodiment, the direction of the offset is the default value in the database.

In a step 5113, the direction and the value of the angular deviation Delta is determined. In one embodiment, the computation is done automatically as a function of the information describing the obstacle zone around the landing zone and/or of the safety distance. In a variant embodiment, the direction and the value of the DELTA are entered manually by the crew or on reception by digital data link. In a variant embodiment, the default values in the database are used.

In a step 5114, a type of approach is determined.
If offset is defined and Delta=0, then
  Type of approach="Offset approach"
Else if Offset=0 and Delta non-nil,
  Type of approach="Delta approach"
Else if Offset and Delta non-nil,
  Type of approach="Offset/Delta mixed approach". This type of approach is an additional capability allowed by the invention.
Else (in the case Offset=0 and Delta=0)
  Type of approach="approach in the axis". This type of approach corresponds to the conventional RNAV approaches, which currently include only an FAF; the automatic determination of the IF and of the IAF is an additional capability allowed by the invention.

In the step 520, the data relating to the outside environment that can influence the approach to the platform are received. For example, the weather conditions (direction and strength of the wind 160), global conditions (over the zone) and/or local conditions (anemometry) can be measured and communicated to the aircraft, the flight conditions (day/night) to determine the safety margins.

In one embodiment, in the step 520, parameters additional to those received in the step 510 are determined.

Examples of intermediate steps are described hereinbelow.

In a step 5201, the values of MDH 304 (or MDA in an equivalent manner) are determined according to the flight conditions (day/night), of the safety distance DS and of desired minimum distance D_Eloi 133 and D_Map 145. In one embodiment, these values will be those taken from the platform database. In a variant embodiment, they will be values entered manually. In a variant embodiment, they will be default values. In a variant embodiment, the safety distance DS will be computed as a function of the geometry of the platform, based on the platform polygon supplied in the preceding step.

In a step 5202, a safety "boundary" is determined (this perimeter does not exist in the prior art). In one embodiment, said boundary is equal to the "platform polygon" representing the obstacle zone 199, augmented by a safety margin; the safety distance DS relative to the landing zone 198 is then estimated according to the distance to the boundary in the axis of arrival augmented by the safety margin. In an alternative, the boundary is equal to a circle centred on H, of value DS.

In a step 5203, the start of the approach is determined. This step initializes the parameters corresponding to the start of the approach (i.e. to the end of the cruising/descent flight phase preceding the approach). This phase is defined by an altitude and the speed for the start of the approach procedure (MEA 300, VIAF 410/411) from the navigation computer in a preferred embodiment. In a variant embodiment, the altitude and the speed will be able to be entered manually by the pilot or received from a third-party system for example by data link.

In a step 5204, other intermediate altitude and speed parameters are determined, like the altitude value at the FAF (MSA 303) and the speed to begin the final approach (VAPP 430/431). In one embodiment, the altitude and the speed will be able to be defined manually by the pilot or received from a third-party system, for example by data link.

In the step 530, the four regulatory waypoints MAP, FAF, IF, and IAF are determined in terms of position (lateral and vertical) and in terms of speed. Advantageously, the determination of these four waypoints makes it possible to ensure the management of all possible types of approaches.

Details and examples of intermediate steps of this determination are described hereinbelow.

In a step 5301, the MAP value is determined by:

$$MAP = \text{func}\_1(H, \text{course}, \text{Offset}, D\_\text{map}, D\_\text{Eloi}, \text{Delta})$$

For the computation of an angular distance point P_DELTA 135: the P_DELTA is situated on the axis (possibly offset along the axis parallel to the approach axis 105 by the offset 170 value), at a distance relative to the helideck 198 equal to D_Eloi 133.

If approach type=Offset or in the axis, MAP is at the distance D_map=max(DS, Default_D_map) from H, Default_D_MAP being a constant numeric value (for example 0.25 NM).

If approach type=Delta or mixed Offset/delta, the MAP is situated on the half line starting from P_DELTA, deviated angularly from the approach course by the value DELTA 132, and situated at the distance D_Map projected on the approach axis.

For all the approaches, Altitude(MAP) is equal to MDA.

In a step 5302, the IAF value is determined by $$IAF = \text{func4}(H, CRS, D\_\text{Eloi}, \text{conf data}), \text{Alt}\_IF = MEA$$

The IAF point is situated on the axis starting from the landing zone 198, oriented by the "course" CRS 180. The altitude (IAF) is equal to MEA.

In one embodiment, the IAF point is situated at a given or predefined distance from the helideck, for example taken from a configuration table ("conf data") or from a database (for example 9 NM in FIG. 3), or at a given distance from the IF waypoint which follows it (for example 2 NM in FIG. 3). In a variant embodiment, the distance can be determined by the crew through a human-machine interface HMI. In a variant embodiment, this distance can be computed "in the reverse direction", relative to the point P_Delta, for example as a function of the altitude to be absorbed between the altitudes MEA, MSA and MDA (for example according to one or more descent slopes determined according to a configuration table or a database and/or by the crew, or even parameters received by digital data link, and according to a minimum length of level at the altitude MEA).

In a step 5303, the FAF value is determined by $$FAF=\text{func\_2}(H, CRS, D\_Eloi, \text{Offset}, \text{Conf data})$$

The FAF waypoint is aligned on the axis A 105 if the "Offset" value is nil, and offset by the "Offset" value relative to this axis otherwise; the altitude value (FAF) is equal to MSA.

In one embodiment, the FAF waypoint is situated at a given or predefined distance from the helideck, for example as a function of "conf data" parameters taken from a configuration table or from a database (for example 5 NM in FIG. 3). In one embodiment, this distance can be entered by the crew through a human-machine interface HMI and/or computed "in the reverse direction" relative to the Delta point, for example as a function of the altitude to be absorbed between the altitudes MSA and MDA (the precise computation modalities can be similar to the preceding case on the IAF waypoint, i.e. according to a slope determined in a configuration table or a database and/or the crew and/or by using a digital data link, the involvement of a third-party system such as air traffic control, radar mechanisms, local wind measurements, etc.).

In a step 5303, the IF value is determined by:

$$IF=\text{func\_3}(FAF, CRS, \text{Offset}, \text{conf data}), \text{Alt\_}IF=MEA,$$
and selection of vertical dive & drive or CDA
guidance mode between IF,FAF In a so-called "basic" embodiment, the IF point is always aligned on the axis A 105. In a so-called "early alignment" embodiment if the "Offset" value is non-nil, the IF point is offset by the "Offset" value relative to this axis.

The altitude (IF) is equal to the altitude MEA.

It is situated at a given distance from the helideck, for example as a function of "conf data" parameters taken from a configuration table or from a database (for example 7 NM in FIG. 3) or at a given distance from the FAF which follows it (for example 2 NM in FIG. 3). In an alternative, the distance can be entered by the crew through an HMI, or computed in the reverse direction relative to the Delta point, as a function of the altitude to be absorbed between MEA, MSA and MDA according to one or two slopes fixed by a "conf data" configuration table or a database or by the crew or received by digital data link.

In the step 540, the lateral and vertical trajectories are determined.

In one embodiment, the points IAF, IF, FAF, P_DELTA and MAP are linked by "legs" (flight plan segments) of TF (Track between fixes) type, i.e. orthodromic, and the arrival on the IAF waypoint is done from the turning point TP.

The lateral trajectory consists of arcs and orthodromic straight segments linking the different points of the flight plan.

The vertical trajectory consists of straight vertical segments linking the IAF, IF, FAF and MAP points to the computed altitudes:

a) Level between IAF and IF at the altitude MEA, and switch from a speed VIAF to a speed VINT. In a preferred embodiment, the deceleration is done as late as possible so as to arrive exactly at the speed VINT at the IF. In an alternative, the deceleration is done continuously between VIAF and VINT (constant deceleration). In an alternative, the deceleration is done as early as possible (after the IAF).

b) Descent segment between IF and FAF to switch from the altitude MEA to MSA (or hold at the level if altitude (MEA)=altitude (MSA)) by decelerating from VINT to VAPP.

In one embodiment, the descent is of "CDA" (Continuous descent approach) type, i.e. a single straight segment joining the 2 points in altitude, in a variant embodiment, the descent ends a little upstream of the FAF point (at D_LOP_FAF equal to 0.25 NM for example, configuration parameter) at the point LOP_FAF 326, to guarantee an anticipated stabilization level before the FAF (Level Off before FAF).

In an alternative, the descent is of "Dive & Drive" type, i.e. a descent starting from the IF with a slope value greater than the CDA, to meet the altitude of the MEA, followed by a level at the altitude of the MSA to the FAF point.

In an alternative, the descent is of "Drive & Dive" type, i.e. a level at the altitude of the MEA starting from the IF, followed by a descent with a slope value greater than the CDA to arrive at the FAF point with an altitude equal to the MSA.

Regarding the speeds, the deceleration can be done at the latest possible moment (preferred mode), constantly, or at the earliest possible moment (alternatives) as for the step a).

c) Descent segment between the FAF and the MAP to switch from the MSA altitude to MDA (or hold at level if altitude (MDA)=altitude (MSA)) by decelerating from VAPP to VATT.

In one embodiment, the descent is of "CDA" (Continuous descent approach) type, i.e. a single straight segment joining the 2 points.

In a variant embodiment, the descent is of "CDA" (Continuous descent approach) type, ends a little upstream of the MAP point at the point LOP_MAP (at a distance D_LOP_MAP equal to 0.25 NM for example, configuration parameter), to guarantee an anticipated stabilization level before the MAP (Level Off before MAP).

Regarding the speeds, the deceleration can be done at the latest possible moment (preferred mode), constantly, or at the earliest possible moment (alternatives) as for the step a).

The deceleration is done in 2 stages, from VAPP to VMAP between the level start points FAF and LOP_MAP and from VMAP to VATT between the points LOP_MAP and MAP.

In the step 550, the trajectory parameters are displayed to the pilot (e.g. locally in the cockpit of the helicopter or in a drone piloting station). In local display conditions, the list of the flight plan points (e.g. waypoints) is displayed on a screen of MCDU or FMD type. In one embodiment, the approach (flight plan comprising TP, IAF, IF, FAF, P_DELTA, MAP) and the lateral trajectory as well as the landing zone H are displayed on a screen of "Navigation Display" or "Digital Map Display" type. Optionally, the vertical trajectory is displayed on a screen of Vertical Display (VD) type. Optionally, the 3D trajectory deriving from the merging of the lateral and vertical trajectories is displayed on a 2.5D screen (for example collimated) of ND 2.5D or PFD 2.5D or HUD type. In one embodiment, the flight parameters are displayed on a 3D or holographic screen, or even projected by augmented and/or virtual reality.

In the step 550, guidance instructions are determined. In one embodiment, the guidance is automatic in the lateral plane, for example between the point TP and/or IAF point, and the MAP point. In a variant embodiment, an automatic guidance in the vertical plane and in speed terms is performed, in addition to the lateral guidance, between these same points.

Variant embodiments are described hereinbelow. These variants are optional.

In some embodiments, the pilot can select a type of approach out of a plurality of proposed approaches (for example out of the Offset approach or the DELTA approach). The method according to the invention then determines the associated "Offset" and "Delta" parameters accordingly. If the chosen approach is of Offset type, then DELTA is equal to 0. If the chosen approach is of Delta type, then the Offset value is equal to 0.

In some embodiments, the coordinates of the IAF waypoint are determined and displayed instead of a TP, that is to say situated on a circular arc outside of the approach axis.

FIG. 6 schematically illustrates the structure and the functions of a flight management system of F.M.S. type, which can be used to implement embodiments of the method according to the invention.

The invention can be incorporated in an avionic computer of FMS type (or in an FM function of a computer). It can also be managed by an automatic pilot (PA) or by an EFB, tablet or similar equipment item.

FIG. 6 represents an FMS 600 having the following functions described in the ARINC 702 standard. They normally ensure all or some of the functions of i) navigation LOCNAV, 670, to perform the optimal location of the aircraft as a function of the geolocation means (GPS, GALILEO, VHF radio beacons, inertial units, DOPPLER navigation, etc.); ii) flight plan FPLN, 610, for entering the geographic elements that make up the skeleton of the route to be followed (departure and arrival procedures, waypoints, airways); iii) navigation database NAVDB, 630, for constructing geographic routes and procedures from data included in the bases (airports/heliports, points en route, beacons, interception or altitude legs, etc.); iv) performance database, PERF DB 650, containing the aerodynamic and engine parameters of the aircraft; v) configuration table CONFDB, 660, making it possible to configure the functions of the FMS according to the operational context of use; vi) lateral trajectory TRAJ, 620: to compute a continuous trajectory from the points of the flight plan that observes the aeroplane performance levels and the confinement constraints (RNP); vii) predictions PRED, 640: to construct an optimized vertical profile along the lateral trajectory; viii) guidance, GUID 600, to guide the aircraft in the lateral and vertical planes on its 3D trajectory, while managing the speed (4D); ix) digital data link DATALINK, 680 for communicating with the control centres and other aircraft.

From the flight plan defined by the pilot (list of waypoints), the lateral trajectory is computed as a function of the geometry between the waypoints (commonly called LEG) and/or the altitude and speed conditions (which are used to compute the turn radius). On this lateral trajectory, the FMS optimizes a vertical trajectory (in altitude and speed), passing through any altitude, speed, time constraints.

During the descent to its destination when the aircraft is guided in "Managed mode" (that is to say by the FMS), the system must determine the segment of the reference profile to be used in terms of vertical guidance.

The method according to the invention can be implemented in a component of "FPLN" type for the construction of the points AIF, IF, FAF, P_DELTA, MAP, on the basis of the parameters present in a navigation database NAVDB (platform characteristics, sector of arrival, safety distance, etc.) and of "conf data" configuration parameters among other things in a CONFDB 660 for the construction of the approach profile. The MDH, the axis A of approach, the offset or Delta value can be initialized (by default) in the NAVDB or the CONFDB, or computed by the FPLN component or by a TRAJPRED component (because dependent on the wind supplied by LOC or on visibility conditions for some of them). All the parameters can also be entered manually by the crew via the human-machine interfaces (HMI), or received from the operator by a digital data link (AOC, ATC centres). The lateral trajectory which is based on the list of the waypoints of the approach is the responsibility of the TRAJ component, and the vertical trajectory is usually computed by the PRED component. The lateral and vertical guidance is the responsibility of the GUID component or can be performed directly by the automatic pilot. The crew views its approach on the human-machine interfaces (HMI).

The present invention can be implemented from hardware and/or software elements. It can be available as computer program product on a computer-readable medium. The medium can be electronic, magnetic, optical or electromagnetic.

In one embodiment, the method is implemented by computer.

In one embodiment, the system for implementing the invention comprises a computer-readable storage medium (RAM, ROM, flash memory or another memory technology, for example disk medium or other non-transient computer-readable storage medium) coded with a computer program (that is to say several executable instructions) which, when it is executed on a processor or several processors, performs the functions of the embodiments described previously. As an example of hardware architecture suitable for implementing the invention, a device can comprise a communication bus to which are linked a central processing unit or microprocessor (CPU), which processor can be "multi-core" or "many-core"; a read-only memory (ROM) being able to include the programs necessary for the implementation of the invention; a random access memory or cache memory (RAM) comprising registers suitable for storing variables and parameters created and modified during the execution of the abovementioned programs; and a communication or I/O (Input/output) interface suitable for transmitting and receiving data.

In the case where the invention is implemented on a reprogrammable computation machine (for example an FPGA circuit), the corresponding program (that is to say the sequence of instructions) can be stored in or on a removable storage medium (for example an SD card, or a mass storage such as a hard disk, e.g. an SSD) or non-removable, volatile or non-volatile storage medium, this storage medium being partially or totally readable by a computer or a processor. The computer-readable medium can be transportable or communicable or mobile or transmissible (i.e. by a 2G, 3G, 4G, Wifi, BLE, fibre optic or similar telecommunication network).

The reference to a computer program which, when it is run, performs any one of the functions described previously, is not limited to an application program running on a single host computer. On the contrary, the terms computer program and software are used here in the general sense to refer to any type of computing code (for example, application software, firmware, microcode, or any other form of computer instruction, like web services or SOA or via API programming interfaces) which can be used to program one or more processors to implement aspects of the techniques described here. The computing means or resources can in particular be distributed ("Cloud computing"), possibly with or according to peer-to-peer and/or virtualization technologies. The software code can be executed on any appropriate processor (for example, a microprocessor) or processor core or a set of processors, whether provided in a single computation device or distributed between several computation devices (for example as possibly accessible in the environment of the device). Securing technologies (crypto-processors, possibly biometric authentication, encryption, chip card, etc.) can be used.

The display devices can comprise or implement one or more sophisticated devices such as virtual reality headsets and/or augmented reality glasses (e.g. "head-mounted display", "wearable computer", "glasses" or a video headset) and/or projection devices (e.g. holographic). A virtual reality headset worn by the pilot can be opaque or semi-transparent or with configurable transparency). The display can be "head up". The headset can comprise one or more computation and communication, projection, audio acquisition, video projection and/or acquisition devices (for example for the capture or "scraping" of data accessible in analogue fashion from the cockpit or the piloting cabin of the aircraft). The cockpit of the helicopter can also comprise voice command devices. The embedded instrumentation can advantageously allow the pilot to view his or her flight plan or trajectory in 3D, in particular the different waypoints according to the invention. The pilot will for example be able to view—for example by overlay on his or her real environment—the different approaches to the target platform, the trajectory joins when the latter are still possible (switching from one type of approach to another). The safety distance will be able to be viewed by graphic envelopes (cones, volume polyhedra, virtual walls, virtual corridors, etc.), as well as local parameters (for example wind speed, real measurements by laser anemometry of local winds or turbulences, or digital simulations thereof).

Finally, haptic feedback devices incorporated in the system for implementing the invention will be able to enrich the guidance/piloting (specific vibrations on actually crossing a waypoint, etc.).

Regarding the display, the information can be displayed in one or more virtual and/or augmented reality headsets. The information can therefore be entirely virtual (displayed in an individual headset), entirely real (for example projected onto the flat surfaces available in the real environment of the cockpit of the helicopter) or a combination of the two (partly virtual display overlaid or merged with the reality and partly a real display via projectors). The display can also be characterized by the application of predefined placement rules and display rules. For example, the human-machine interfaces (or the information) can be "distributed" (segmented into distinct portions, possibly partially redundant, then allocated) between the different virtual or real screens.

In some embodiments, the various steps of the method can be implemented wholly or partly on the FMS and/or on one or more EFBs (electronic flight bags) and/or tablets and/or airline or mission computer.

The invention claimed is:

1. A method for managing the approach to a platform 199 by an aircraft 100, implemented in a flight management system 600, the method comprising:
receiving initial parameters and
from these initial parameters, determining an approach trajectory comprising at least the coordinates of four waypoints including:
an Initial Approach Fix (IAF) waypoint 110 corresponding to the starting point of the approach procedure;
an Intermediate (IF) waypoint 120 corresponding to the point from which the aircraft begins to capture the final approach axis 105;
a Final Approach Fix (FAF) waypoint 130 corresponding to the starting point of the final approach;
a Point of Decision (MAP) waypoint 140 corresponding to the point of decision to terminate the approach or initialize a go-around,
wherein
the IAF 110 and IF 120 waypoints of a procedure starting altitude MEA 300 are situated on the axis A 105 starting from a landing zone H 198 and oriented by a course CRS 180;
the FAF waypoint 130 of a minimum safety altitude (MSA) 302 is aligned in the lateral plane with the points IAF 110 and IF 120 on the axis A 105 if an offset value OFFSET value 170 is equal to zero, and offset from this OFFSET value 170 relative to the axis A 105 otherwise; and
the MAP waypoint 140 of a minimum decision altitude MDA 304 is aligned along the direction of the axis A 105 with the FAF waypoint 130 if an angular deviation value DELTA 132 is nil, and offset angularly from the axis A 105 otherwise, said MAP waypoint 140 being situated at a distance equal to a distance D_map 145 relative to the landing zone H 198.

2. The method according to claim 1, the initial parameters being determined by the steps of:
receiving geographic coordinates of the landing zone H 198 on said platform 199;
receiving the flight parameters relating to the course CRS 180 leading to said landing zone 198;
receiving the OFFSET 170;
receiving the DELTA 135;
receiving a distance value (D_Eloi) 133;
receiving indication of the MDA 304;
receiving indication of the MSA 302; and
receiving indication of the MEA 300;
receiving indication of an initial speed constraint (VIAF) 410/411;
receiving indication of an intermediate speed constraint (VINT) 420/421;
receiving indication of an approach speed constraint (VAPP) 430/431;
receiving indication of a visual acquisition speed constraint (VMAP) 435/436;
receiving indication of a landing speed constraint (VATT) 440/441.

3. The method according to claim 1, further comprising graphically displaying one or more of the coordinates of the IAF 110, IF 120, FAF 130 and MAP 140 waypoints.

4. The method according to claim 1, further comprising graphically displaying one or more aircraft guidance instructions to follow the approach trajectory comprising the IAF 110, IF 120, FAF 130 and MAP 140 waypoints and by observing the speed profile VIAF (410/411), VINT (420/421), VAPP (430/431), VMAP (435/436) and VATT (440/441).

5. The method according to claim 1, further comprising computing a capture trajectory for the starting point (IAF 110) of the approach procedure from the point TP 100.

6. The method according to claim 1, further comprising receiving at least one additional parameter relating to the initial OFFSET value 170 for laterally offsetting the intermediate point IF 120 from the value of the Offset 170.

7. The method according to claim 1, further comprising receiving indication of a safety distance DS 197 associated with the geometry of the platform.

8. The method according to claim 7, the MAP waypoint 140 then being situated at the distance D_MAP 145 from the landing zone H 198 equal to the maximum between the distances DS 197 and a default distance Default_D_Map.

9. The method according to claim 7, wherein the safety distance DS 197 is configurable.

10. The method according to claim 1, the values of the OFFSET 170 and of the angular deviation DELTA 132 being equal to zero.

11. A non-transitory computer readable medium comprising a computer program product, said computer program comprising code instructions making it possible to perform the method according to claim 1, when said program is run on a computer.

12. A system for implementing the method according to claim 1, comprising a non-transitory computer readable medium comprising a flight management system of F.M.S avionics type.

13. The system according to claim 12, wherein the platform is a platform of offshore type and the aircraft is a helicopter.

14. The system according to claim 12, wherein the platform is mobile.

* * * * *